July 9, 1940.  R. A. GULICK  2,207,057

LIQUID STRATIFICATION

Filed June 1, 1938

Inventor
Russell A. Gulick
by Roberts, Cushman & Woodbury
attys

Patented July 9, 1940

2,207,057

UNITED STATES PATENT OFFICE 2,207,057

LIQUID STRATIFICATION

Russell A. Gulick, Winthrop, Mass., assignor, by mesne assignments, to Stator Corporation, a corporation of Rhode Island Application June 1, 1938, Serial No. 211,157

6 Claims. (Cl. 257—198)

This invention relates to means associated with a hot water tank for impeding the mixture of incoming unheated water with hot water in the tank. Stratification means of this type is more particularly advantageous in a combined refrigerating and water-heating system of the type disclosed in the copending application of Lyman F. Whitney, Serial No. 192,343, filed February 24, 1938. Such a system is provided with a water tank having two condensers associated therewith, and arranged to transfer heat from the refrigerating system of the apparatus to the stored water, one of these condensers normally having a relatively high temperature and the other condenser operating at a substantially lower temperature, so that the condensers may ordinarily be located respectively in hot and warm zones within the tank.

Apparatus of this character is also provided with a dump valve operable to emit some of the hot water from the tank when the temperature of the region of either dissipator rises unduly. The apparatus, furthermore, preferably is provided with an auxiliary heater which supplies additional heat to the stored water when the temperature of water in the upper part of the tank falls below a determined point.

As described in the above-entitled copending application, it is desirable to provide such a tank with stratification means to impede the mixture of incoming unheated water with heated water within the tank, and particularly in the upper part of the tank. Such stratification means not only avoids the undesirable reduction in temperature of water which has already been heated, but also avoids unnecessary movement of hot water into the warm zone and consequent unnecessary operation of the temperature-responsive dump valve and consequent waste of hot water.

Furthermore, such an arrangement prevents the unnecessary cooling of water in the upper part of the tank and consequent unnecessary operation of the auxiliary heater. As disclosed in the above-entitled application, such stratification means may include an inlet connection for the unheated water which increases in cross section as it extends toward the tank. Thus, for example, the connection may be flared and may be of generally frusto-conical form. The stratification means disclosed and claimed in the above-entitled application also comprises a deflector plate disposed within the tank in close juxtaposition to the wall thereof and arranged to extend over the open end of the inlet connection and to a substantial distance at each side thereof. The arrangements thus disclosed in the copending application result in the movement of the water through the inlet connection and beneath the deflector plate to spaced portions of the lower part of the tank where the water may flow at relatively low velocity into the lower part of the tank.

The present invention affords additional means for impeding the mixture of the incoming water with the heated water. This additional means may be employed either in combination with the flared inlet connection and the deflector plate of the co-pending application, or without one or both of these features. In the preferred embodiment of the invention, however, the stratification means of the present invention is combined with the stratification means shown in the above-entitled application. In order to aid gradual flow of the unheated water into the tank and to cause distribution of the water so that it flows into different parts of the tank, the present invention provides one or more perforated plates in the region of the inlet connection. For example, if the inlet connection is of the flared type such as disclosed in the above-entitled application, the perforated plate or plates may be disposed in this flared connection, extending substantially across the same and providing a plurality of mutually spaced openings through which relatively small streams of water may pass upwardly. Preferably a plurality of plates are arranged in this manner so that they act as baffles to impede the inflow of water under pressure, and to cause the incoming water stream to be broken up. In the preferred form of the invention there are three perforated baffles arranged in the general manner described, and each of these baffles may be of concavo-convex form. The smallest baffle may be located in the lower part of the inlet connection and may be bulged upwardly while there may be a pair of larger baffles disposed in the upper part of the connection and extending substantially across the same. For purposes of structural convenience this pair of upper baffles may comprise similar plates, the lowermost plate, however, being bulged upwardly and the upper plate being bulged downwardly.

In the accompanying drawing:

Fig. 1 is an elevational view of a hot water tank of the type employed in a combined refrigerating and water-heating apparatus and provided with stratification means constructed in accordance with this invention, parts being broken away and shown in section in this figure;

Figure 1:
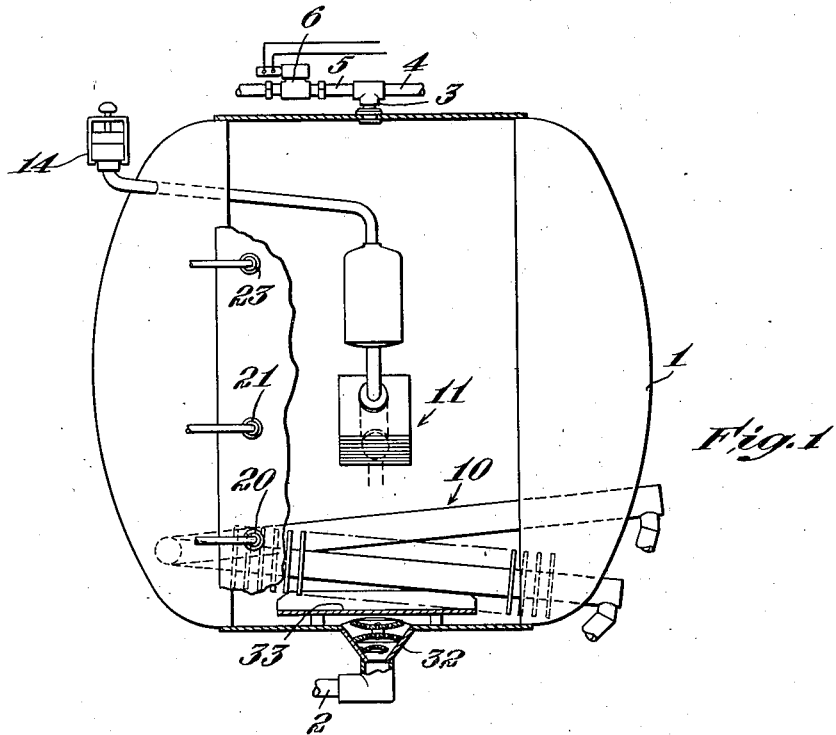
Figure 2:
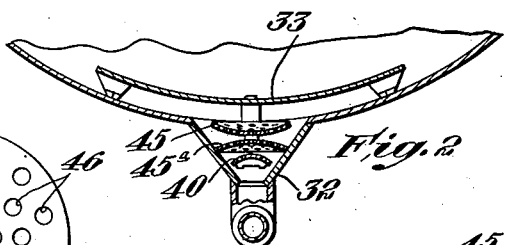
Fig. 2 is a sectional detail of the lower part of the tank showing the stratification means.

The accompanying drawing shows a hot water tank 1 which may conveniently form a part of a combined refrigerating and water-heating apparatus of the general type disclosed in the above-entitled application. Such a tank may conveniently have outwardly bulged end walls and may be formed of metal of low heat conductivity, such as a silicon-bronze alloy. Such a tank may be provided with an inlet duct 2 and with an outlet connection 3, the latter having a branch 4 to supply hot water to the faucets of the house where the apparatus is installed, while a second branch 5 of this connection is associated with a quick acting dump valve 6 of the electromagnetically actuated type. This dump valve is arranged so that it is actuated in response to undesirably high temperature of water to cause the outflow of water through the branch 5 to a suitable drain.

The tank may contain a lower condenser or heat dissipator 10, such as the refrigerant condenser of the refrigerating system, and an upper high temperature condenser or dissipator 11 arranged to transfer heat from high temperature portions of the refrigerating system to the stored water. The condenser 11 may conveniently form part of a closed system containing alcohol, this system being evacuated through a sealing connection 14 so that the alcohol may vaporize at a relatively low temperature and thus may readily rise to the condenser 11 and there give up its heat to the water within the tank 1.

A temperature responsive bulb 20 may be located in a socket in the lower part of the tank, i. e. substantially at the level of the condenser 10, this temperature responsive bulb forming part of a thermostatic means which causes operation of the dump valve 6 when the temperature of the water in the corresponding portion of the tank rises above a predetermined point such as 120° F. A thermostatic bulb 21 may similarly be arranged above the bulb 20 and substantially on a level with the high temperature dissipator 11, the bulb 21 forming part of thermostatic means for operating the dump valve 6 when the temperature of the corresponding water rises above a predetermined point such as 170° F. A third thermostatic bulb 23 is arranged in a socket in the upper part of the tank and is associated with suitable means to cause operation of the auxiliary water heater when the temperature of the water in this part of the tank falls below a predetermined point such as 150° F.

In order to aid stratification of the water and to impede mixture of incoming unheated water with hot water in the upper part of the tank, the inlet duct 2 may be provided with an upwardly flared connection 32 with the lower part of the tank 1. To cooperate with this flared connection a deflector plate 33 may be arranged above the open end of the connection and in rather close generally parallel relation to the adjoining wall portion of the tank 1. The margins of the deflector plate 33 preferably are spaced at substantial distances from the inlet connection 32 so that the incoming water passing upwardly through this connection is deflected in different directions by the plate 33 and passes into the main body of stored water about the various edges or marginal portions of the plate. Accordingly the inflowing unheated water does not flow into the tank in a single concentrated stream, and there is a region of substantial size which receives the unheated water. Furthermore, the space between the perimetric portion of the plate 33 and the corresponding wall portions of the tank affords a passage of substantial cross-sectional area through which the water may move into the tank.

The apparatus and structure so far described are of the type disclosed in the above-entitled application. In accordance with this invention, stratification means may be associated with the inlet connection further to impede the inflow of water at a high velocity and to break up the incoming water stream. For this purpose I prefer to employ one or more perforated baffle plates extending substantially across the inlet connection and providing a plurality of spaced openings through which the incoming water flows in relatively small streams.

Figure 4:
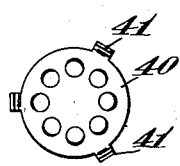
Fig. 4 is a similar view of the lower baffle plate.

The preferred form of such stratification means involves the provision of a plurality of dished or concavo-convex baffle plates, for example, in the manner shown in the accompanying drawing. For this purpose the lower baffle plate 40, shown in Fig. 4, may be provided with an upwardly bulged body portion and with a single circular set of openings. The plate may conveniently be provided with three upwardly extending tabs or ears 41 which are secured as by welding or brazing to the wall of the flared inlet connection 32. It is evident that as shown the edge of the plate 40 may be closely spaced from the adjoining wall portion of the connection 32 (Fig. 5) and that the plate 40 extends substantially across this portion of the connection.

Figure 3:
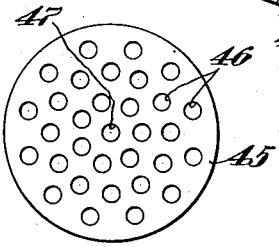
Fig. 3 is a plan view of the upper baffle plate.
Figure 5:
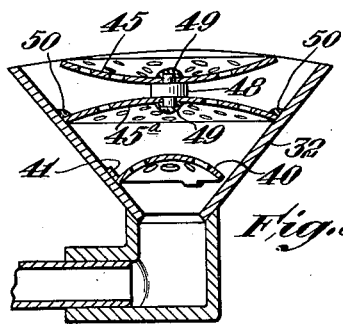
Fig. 5 is a sectional detail of the stratification means but on a larger scale than Fig. 2.

Above the baffle plate 40 I preferably provide two similar baffle plates 45 and 45ª. One of these plates, namely the plate 45, is shown in Fig. 3, and is provided with a plurality of mutually spaced openings 46 through which water may pass, these openings being conveniently arranged in concentric circles, as shown. As shown in Fig. 5, the baffles 45 and 45ª may be similarly dished or provided with concavo-convex curvatures. Each of these baffles may be provided with a central opening 47 (Fig. 3) and a spacer 48 may be arranged between the central portions of these baffles, the spacer providing portions of reduced diameter extending through the respective central openings of the baffles. The baffles then may be secured by brazing 49 to the spacer 48, the lower baffle 45ª having its peripheral portion engaging the wall of the flared connection 32 and being secured thereto by brazing 50. It is thus evident that the baffle 45ª extends entirely across the corresponding portion of the inlet connection 32 and that due to the flared shape of this connection the similar upper baffle 45 has its periphery spaced somewhat from the corresponding part of the connection. It is furthermore evident that the baffle 45ª is preferably bulged upwardly and that the baffle 45 is bulged downwardly, the minimum spacing of these baffles being in the region of the spacer 48.

When water is withdrawn from the tank 1 either through the pipe 4 or due to the operation of the dump valve 6, the pressure of water in the supply mains causes incoming water to flow through the duct 2 and the inlet connection 32 into the tank. This incoming water, however, is divided into restricted streams by the perforations in the baffles which serve to cause the distribution of the water into various parts of the flared inlet 32. The incoming water is then caused to pass between the margins of the deflector plate 33 and the corresponding portions of the wall of the tank, and thus may pass into the main body of water at relatively low speed and under reduced pressure. Consequently the incoming unheated water is substantially prevented from rising into the upper part of the tank, i. e. into the region of the high temperature dissipator 11 and the bulb 21 or into the region of the bulb 23. As a consequence, even if a substantial amount of water has been withdrawn from the tank, a body of hot water may still remain at the upper part of the tank ready for use and substantially free from admixture with the incoming unheated water. Accordingly, unnecessary operation of the auxiliary heater due to reduction in the temperature of the bulb 23 is avoided. Furthermore, when, for example, the dump valve 6 operates, due to an increase in the temperature of the bulb 21 to the predetermined point, e. g. 170° F., the incoming unheated water does not mix with the hot water in the tank in such a manner as to cause the temperature of the condenser 10 to rise above the desired point, and thus possibly cause a second actuation of the dump valve due to the relatively high temperature of the bulb 20.

It should be understood that the present disclosure is for the purpose of illustration only and that this invention includes all modifications and equivalents which fall within the scope of the appended claims.

I claim:

1. The combination comprising a hot water tank, a water inlet duct having a connection with said tank, an outlet duct extending from said tank, said inlet connection increasing in cross-sectional area as it extends toward the tank, and a perforated baffle plate in said connection to divide the incoming water stream into a plurality of restricted streams.

2. The combination comprising a hot water tank, a water inlet duct having a connection with said tank, an outlet duct extending from said tank, said inlet connection increasing in cross-sectional area as it extends toward the tank, and a plurality of baffle plates in mutually spaced relation in said connection to divide the incoming water stream into a plurality of restricted streams.

3. The combination comprising a hot water tank, a water inlet duct having a connection with said tank, an outlet duct extending from said tank, said inlet connection increasing in cross-sectional area as it extends toward the tank, a perforated baffle plate in said connection to divide the incoming water stream into a plurality of restricted streams, and a plate of substantial area within the tank in closely spaced relation to the wall thereof and extending over said inlet connection.

4. The combination comprising a hot water tank, a water inlet duct having a connection with said tank, an outlet duct extending from said tank, said inlet connection increasing in cross-sectional area as it extends toward the tank, and a concavo-convex baffle plate in said connection, said plate having marginal portions juxtaposed to the adjoining wall portions of the connection.

5. The combination comprising a hot water tank, a water inlet duct having a connection with said tank, an outlet duct extending from said tank, said inlet connection increasing in cross-sectional area as it extends toward the tank, and a concavo-convex baffle plate in said connection, said plate having marginal portions closely spaced from the adjoining wall portions of the connection, said baffle plate having mutually spaced perforations therein.

6. The combination comprising a hot water tank, a water inlet duct having a connection with said tank, an outlet duct extending from said tank, said inlet connection increasing in cross-sectional area as it extends toward the tank, stratification means within said inlet connection comprising a plurality of perforated baffle plates, one of said plates fitting within a portion of the connection which has a relatively small cross-sectional area and being bulged toward the tank, the stratification means also including a pair of substantially similar, oppositely bulged, perforated plates, one of which fits within the connection and the other of which is connected to the mid portion of the other similar plate.

RUSSELL A. GULICK.